Oct. 7, 1958 V. ROVTAR 2,855,248
JOURNAL BEARING FOR A RAILROAD CAR
Filed Sept. 19, 1955 2 Sheets-Sheet 2

INVENTOR.
VICTOR ROVTAR
BY
Eber J. Hyde
ATTORNEY

United States Patent Office 2,855,248
Patented Oct. 7, 1958

2,855,248

JOURNAL BEARING FOR A RAILROAD CAR

Victor Rovtar, Wickliffe, Ohio, assignor to Clevite Corporation, Cleveland, Ohio, a corporation of Ohio Application September 19, 1955, Serial No. 534,982

3 Claims. (Cl. 308—83)

This invention pertains to a railroad journal bearing, and more particularly to a bearing which can be inserted on the journal of railroad car as a replacement for a worn-out bearing without any mechanical alteration of the journal and with only minor alteration of the journal box.

The bearing of the present invention is particularly adapted for replacement of existing journal bearings since very little modification of the railroad equipment is required, and it is also suitable for original equipment due to the fact that it is relatively inexpensive due to its long life and trouble-free service.

It is an object of the present invention to provide a railroad journal bearing for original equipment and for replacement use which is economical due to its excellent bearing qualities, its long trouble-free life, its simplicity, its relatively low cost, and its ease of installation in already existing equipment.

Another object of the invention is to provide a railroad journal bearing which provides positive lubrication of the journal and which needs mechanical inspection only about once every three years when the AAR air brake inspection is made, thus saving the railroads considerable inspection cost.

For a better understanding of the present invention, together with other and further objects thereof, reference is had to the following description taken in connection with the accompanying drawings, and its scope will be pointed out in the appended claims.

Figure 1:
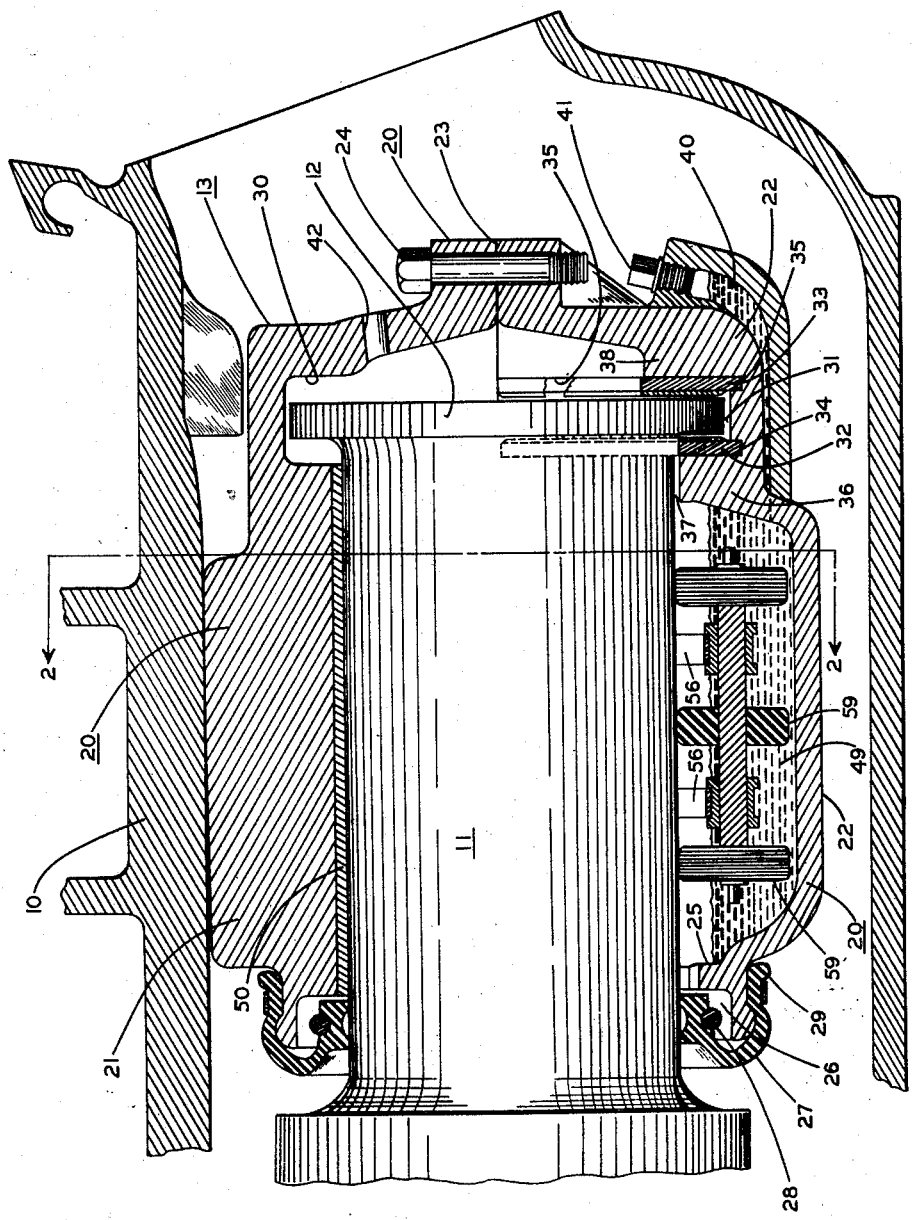
Figure 2:
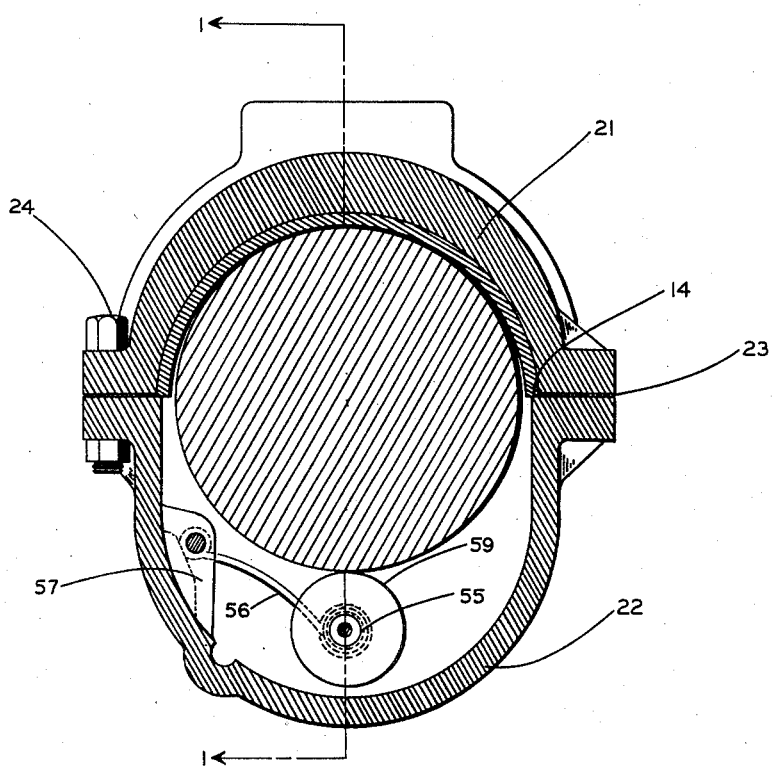
Figure 3:
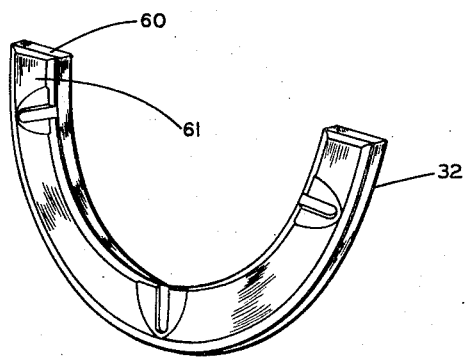

In the drawings, Figure 1 is a sectional view taken along line 1—1 of Figure 2, showing a railroad journal bearing incorporating this invention, Figure 2 is a sectional view taken along line 2—2 of Figure 1, and Figure 3 is an isometric view of the thrust bearing portion of the journal bearing shown in Figures 1 and 2.

An aspect of the present invention lies in the provision of a railroad journal bearing unit which is to be positioned between the journal box and the journal of a railway car for supporting the journal box on the journal. The bearing unit comprises a rigid metal housing which is cup-shaped, and which preferably is formed by two halves joined together along a plane including the axis of the journal, which surrounds and encloses the journal. Bearing means are included located on the inside upper surface of the cup-shaped housing so that upon installation the bearing is located between the upper surface of the journal and the housing, and the housing supports the journal box on the journal. Sealing means are provided at the open end, or lip, of the cup-shaped housing to effect a liquid tight seal between the housing and the inboard end of the journal. The bottom portion of the housing is spaced quite a distance from the bottom surface of the journal forming a reservoir for lubrication, such as oil. When the reservoir is normally full of lubrication the top surface of the lubricant is spaced below the bottom surface of the journal and is also below the point, or area, of contact between the sealing means and the journal to prevent oil leakage. Rotatable means such as rollers are mounted in the housing between the bottom surface of the journal and the top surface of the lubrication in the reservoir for supplying lubrication to the journal. Thrust bearing means are located in the lower portion of the housing where it receives adequate lubrication. Preferably there are two such thrust bearings, one on either side of the journal flange and within a recess or groove for transmitting lateral thrust between the journal flange and the housing through the bearing means.

With reference to the drawings there is shown in Figure 1 a journal box 10 of a railway car truck, and a journal 11 with an end flange 12. The journal is of conventional construction and does not have to be altered in any respect when the bearing unit 13 of my invention is substituted for an old bearing in an old railway car; the journal box is modified slightly by removing the inboard dust guard when the bearing unit 13 is applied to an old car. The pivoted lid which is usually associated with such a journal box may be dispensed with, thereby saving the railroad the time and money involved in occasionally replacing same. Further, with the removal of the lid air circulation is provided around the bearing resulting in lower operating temperature. It has been found that the bearing of this invention runs 20° F. cooler than a standard bearing.

In the past the railroads have inspected the journal bearings at practically every stop in order to detect lack of lubrication to forestall the development of a hot box. Such an inspection is time consuming since the average freight car has eight journal boxes. Furthermore, in order to keep the inspection time at a minimum the bearing unit was not sealed. Upon opening the lid the bearing was visible and the inspector could see the waste and the oil below the lower edge of the journal.

It is, of course, advantageous to have a sealed bearing unit, thereby to prevent unauthorized persons from tampering with the journal bearings. However, when the bearing is sealed inspection becomes more time consuming. Consequently, the bearing unit 13 of this invention is so designed that inspection of the bearing itself need not be made more than once every three years, preferably at the same time the air brake is inspected, and inspection of oil level need be made only about once a year.

The bearing unit 13 of this invention comprises a rigid metal cup-shaped housing 20 which completely surrounds and encloses the journal 11 and the journal flange 12. Preferably the housing 20 is formed in an upper half 21 and a lower half 22 and they are joined together by bolt 24 along a plane 23 which includes the axis of the journal 11.

The lower half 22 of the cup-shaped housing 20 has an inwardly extending circumferential shoulder 25 near the lip thereof which is spaced slightly below the bottom edge of the journal 11, and an annular groove 26 is formed between the inboard end of the journal 11 and the lip of the housing 20. Sealing means 27 are mounted in this annular groove 26 and a spring device 28 holds part of the sealing means tight against the journal 11 to prevent lubrication, such as oil, within the bearing unit from seeping out of the inboard end of the journal. A lip 29 on the sealing means 27 overlaps the lip of the cup-shaped housing 20 to prevent oil from escaping between the sealing means and the housing. Since there is no relative rotation between the housing 20 and the sealing means 27 there is no pumping action at their interface to promote leakage. Relative rotation takes place between the journal 11 and the sealing means 27. Consequently it is preferable that the normal level of the oil within the housing 20 be below the lowest point of contact between the sealing means and the journal, as shown in Figure 1.

The closed, or outboard, end of the journal housing 20 has a groove 30 in its upper half 21 to accommodate the journal flange 12, and it has a groove 31 in its lower half 22 to accommodate the flange 12 and two thrust bearings 32, 33, are on either side of the flange 12. One of the two thrust bearings is shown in detail in Figure 3. It is to be understood that the bearings 32, 33 are quite similar in size and shape, though it has been found desirable to make the outboard bearing 33 of greater bearing area than the inboard bearing 32. The bearings 32, 33 are mounted in grooves 34, 35 in the cup-shaped housing 20. The grooves 34, 35 extend from the bottom thereof up to the parting line 23 between the upper and lower housing halves 21, 22. A portion of the bearing 33 is broken away in Figure 1 to show the groove 35 in the back wall of the lower half of the housing.

On the opposite side of each of the bearings 32, 33 from the journal flange 12 there is a rigid integral portion of the housing 20 which backs up the bearing. Bearing 32 is backed up by the high integral shoulder 36 but clearance 37 is provided between it and the bottom of the journal 11. Bearing 34 is backed up by the shoulder 38.

The housing 20 includes an inspection hole 40 with a closure plug 41, and also includes an oil filler hole and breather 42. Between the shoulders 25 and 37 the bottom half 22 of the housing 20 is spaced away from the bottom surface of the journal to form a reservoir 29 for holding a supply of lubricant such as oil. The reservoir is filled through breather hole 42 and it runs past and around the thrust bearings 32, 33 filling the lower portions of grooves 31, 34 and 35. It also runs up into the inspection hole 40. In order to inspect the level of the lubricant the plug 41 is removed and the inspector can visually determine the quantity of oil in the reservoir.

The cup-shaped housing 20 supports the journal box 10 on the journal 11 and transmits lateral thrust between the journal box and the journal. The journal flange 12 engages one or the other of the thrust washers 32, 33 to transmit thrust to the lower half 22 of the housing 20. The inside surface of the upper half 21 of the cup-shaped housing 20 includes a bearing 50 to facilitate relative rotation between the journal and the journal box 10. The bearing 50 preferably is a separate element resting on shoulders 14 which are part of the housing 22, but it is possible also to apply a relatively thin layer of bearing material to the inside surface of the upper half 21 of the housing such as by casting or the like. Any of the numerous recognized bearing materials may be used.

In order to assure constant adequate lubrication between the bearing material 50 and the journal 11 means are mounted in the reservoir 49 for constantly applying oil to the surface of the journal as the railway car moves. This lubricating means comprises an axle 55 held by two spaced apart spring members 56 the opposite ends of which are secured to the inner wall of the housing member 22 by a bracket device 57. A plurality of wheels 59 are mounted on the axle 55 with their upper surface in contact with the underneath edge of the journal and with their bottom portions in the oil in reservoir 49. As the journal 11 rotates the wheels rotate and transfer oil to the journal which in turn carries it into contact with the bearing 50. Additionally, this lubricating means serves to supply the journal with sufficient oil that it spreads axially over to the thrust bearing 32 and to maintain sufficient oil in groove 31 to lubricate the outboard thrust bearing 33.

The thrust bearings 32, 33 preferably are formed of a semi-circular or horse-shoe shaped steel backing member 60 to one face of which is secured a layer of bearing material 61, as shown in Figure 3. The bearing material may be cast, sintered, rolled or plated onto the steel backing member, and any of the known bearing materials may be utilized.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A sealed bearing unit to be positioned within a railway car journal box and around the flanged journal of a railway car axle, comprising: a rigid metal cup-shaped housing formed of an upper and a lower semi-cylindrical half and means for securing them together, said cup-shaped housing having a closed outboard end and an open inboard end, said housing surrounding and enclosing said journal with said upper half resting on the top thereof and including bearing means positioned against the upper portion of said journal, sealing means at the open or inboard end of said cup-shaped housing for effecting a seal between said housing and the inboard end of said journal, the bottom half of said housing defining a reservoir for lubricant the surface of which lubricant is spaced below the bottom surface of said journal and is spaced below the lowest point of contact between said sealing means and said journal, means mounted within said housing between the bottom surface of said journal and said lubricant for supplying lubricant to said journal, the outboard end of the lower half of said housing being formed of heavy thrust transmitting metal and defining a groove for receiving the lower half of said journal flange, and thrust bearing means located only on both walls of said groove on either side of said flange for transmitting lateral thrust in both directions from said journal flange through the lower half of said housing to the upper half of said housing.

2. A sealed bearing unit to be positioned within a railway car journal box and around the flanged journal of a railway car axle, comprising: a rigid metal cup-shaped housing formed of an upper and a lower semi-cylindrical half and means for securing them together, said cup-shaped housing having a closed outboard end and an open inboard end, said housing surrounding and enclosing said journal and upon the top half of which said journal box rests, bearing means mounted within the upper half of said housing for supporting said housing on the said journal, sealing means at the lip of said cup-shaped housing for effecting a liquid seal between said housing and the inboard end of said journal, the bottom half of said housing defining a reservoir for liquid lubricant and being sufficiently deep that the top surface of said liquid when the reservoir is normally full is spaced below the bottom surface of said journal and is spaced below the lowest point of contact between said sealing means and said journal, means mounted within said housing between the bottom surface of said journal and said lubricant for supplying lubricant to said journal, the outboard end of the lower half of said housing being formed of heavy thrust transmitting metal and defining a groove for receiving the lower half of said journal flange, and thrust bearing means located only on both walls of said groove in the lower portion of said housing on either side of said flange for transmitting lateral thrust in both directions from said journal flange through the lower half of said housing to the upper half of said housing.

3. A bearing unit to be positioned between a railway car journal box and the flanged journal of a railway car axle, comprising: a rigid metal cup-shaped housing having a lip and formed of two axially disposed halves; means for securing said two housing halves around said journal with the half on top thereof supporting said journal box on said journal, and with the bottom half underneath said journal and having a groove for receiving the flange of said journal; sealing means at the lip of said cup-shaped housing for effecting a liquid seal between said housing and said journal; bearing means connected to the inside surface of the top half of said housing for engaging the top surface of said journal; the bottom half of said housing defining a reservoir for liquid lubricant and being sufficiently deep that the top surface of said liquid when the reservoir is normally full is spaced below the bottom surface of said journal and is spaced below the point of contact between said sealing means and said journal; means mounted within said housing between said journal and said reservoir for supplying lubricant to said journal; thrust bearing means mounted only in the groove in the bottom half of said housing between the wall of said groove and the journal flange for transmitting thrust forces therebetween.

References Cited in the file of this patent

UNITED STATES PATENTS

| | | |
|---|---|---|
| 2,360,737 | Steinmann | Oct. 17, 1944 |
| 2,687,927 | Jackson | Aug. 31, 1954 |
| 2,720,431 | Browne et al. | Oct. 11, 1955 |